Patented Nov. 5, 1940

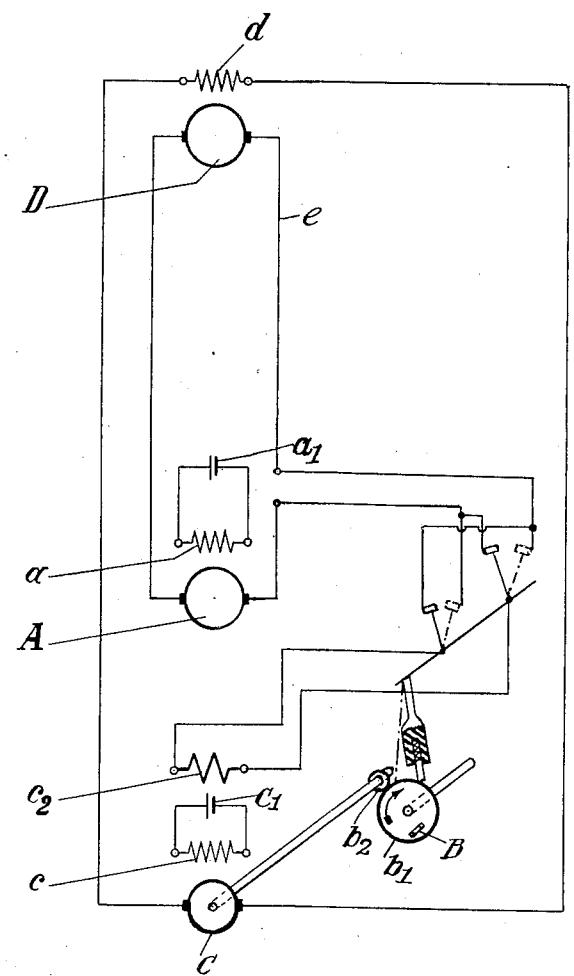

2,220,644

UNITED STATES PATENT OFFICE 2,220,644

WARD-LEONARD DRIVE FOR GUN TURRETS

Anton Gietmann, Dusseldorf, Germany, assignor to Rheinmetall-Borsig Aktiengesellschaft, Dusseldorf, Germany, a corporation of Germany Application August 18, 1938, Serial No. 225,655
In Germany August 8, 1935

2 Claims. (Cl. 172—239)

With Ward-Leonard drives for actuating elevating and traversing mechanism of guns or gun turrets, the excitation of the Ward-Leonard generator (and, therefore the speed and direction of rotation or turning of the working motor and the gun) is controlled by a constantly excited generator driven by a manually operable control wheel.

If in a drive of this kind the speed or the direction of rotation of the hand control wheel is changed suddenly and spasmodically, a certain time elapses before the working motor and the gun have also changed their direction and speed of turning to correspond. The control impulse exerted on the control wheel thus does not act on the working motor and the gun until a certain delay has taken place.

In the known Ward-Leonard drives the delay is so considerable and consequently the control of speed is so indifferent that these drives are not suitable for guns mounted on rapidly or periodically moving supports (for example on armoured cars). In order that the lag between the control wheel movements and those of the working motor may be reduced to a practically permissible value, and that the speed of control both of speed and direction of movement may be increased to the utmost, according to the invention there is provided for the exciter actuated by the control wheel an additional field winding in series with the armatures of the Ward-Leonard generator and the working motor. By means of this winding, when starting, stopping and reversing the direction of rotation of the control wheel, the acceleration or delay of the working motor is improved, so that the working motor follows the changes in speed and direction of rotation of the hand control wheel more quickly. The speed of control of the speed and the reversal of motion is increased.

An example of construction of a Ward-Leonard drive with the additional device according to the invention is shown diagrammatically in the accompanying drawing.

A generator C having a field winding separately and constantly excited from a source of current $C_1$ is arranged to be driven manually in either direction at a desired speed by a crank B and toothed gear wheels $b_1$, $b_2$. The output of the generator C, of which the polarity depends on the direction of rotation of the crank B and the voltage on the speed of rotation of the crank, is supplied to the field winding $d$ of the constantly driven Ward-Leonard generator D. The output of the generator D is supplied to the working motor A which has a field winding $a$ constantly and separately excited from a source of current $a_1$. As the excitation and, therefore, the current delivered by the Ward-Leonard generator depends on the polarity and magnitude of the voltage of the generator C and, therefore, on the speed of rotation of the crank B, the electrical output of the generator and, therefore, the speed and the torque of the working motor A are approximately proportional to the speed of rotation of the crank B.

The invention provides an additional field winding $c_2$ on the generator C which is driven by the crank B and this winding is arranged in series with the armatures of the Ward-Leonard generator and the working motor A. In the circuit of the winding $c_2$ there is arranged a reversing switch $c_3$ which is operated by a member (not shown) arranged on the shaft of the crank B or of the generator C as soon as the direction of the crank B is reversed.

The operation of the drive, particularly the action of the coil $c_2$ when started from a rate of rest will first be explained.

As when the crank B is set in motion the voltage of the generator C increases proportionately to the speed of rotation, the excitation and the electromotive force of the Ward-Leonard generator its speed remaining constant, can increase constantly and rapidly to a considerable value, and as moreover, the elevating motor A, which is still stationary, has no back E. M. F. and the ohmic resistance of the armature circuit $e$ of the Ward-Leonard generator and the working motor is small, a strong current will be developed in this circuit. The winding $c_2$ which is traversed by this current is thus strongly excited in such a manner that the fields produced by the windings $c$ and $c_2$ are additive and the excitation of the generator C is intensified. The voltage of the generator C is thereby likewise increased and accordingly also the excitation and the electromotive force of the Ward-Leonard generator is increased, so that the working motor receives a greater voltage and its current is greater than would be the case if the winding $c_2$ were absent. In consequence of the increased amount of energy available, the working motor is more strongly accelerated and it will assume the proper speed which corresponds to the speed of the crank in each particular case more rapidly than if the winding $c_2$ were absent.

With increasing speed, the back E. M. F. of the working motor A increases rapidly and as this motor approaches its proper speed, the difference between the E. M. F. of the Ward-Leonard generator and the back E. M. F. of the working motor is so slight that the working motor takes up only as much energy as is necessary for compensating for the frictional and other losses of the elevating or other mechanism driven by the working motor.

It is true the winding $c_2$ causes the proper speed of the working motor A corresponding to a certain speed of the crank, to be slightly increased. The winding $c_2$ is, therefore, slightly effective also when the speed of the working motor is constant; but practically one may say that the winding $c_2$ is effective mainly shortly after a sudden increase or decrease in the speed of the elevating crank, when a powerful temporary rush of current is supplied to the working motor A which causes that motor to change its speed quickly in the same proportion as the speed of the crank B changes, which rush of current ceases as soon as the working motor has assumed the new constant speed.

If the drive runs at full speed, and if then by abrupt stopping of the crank its speed is much reduced, then the winding $c_2$ likewise has an advantageous effect.

The motor, by the kinetic energy of the masses moved by it, is first of all kept at its full speed, that is to say its back E. M. F. first of all remains unchanged. The E. M. F. of the Ward-Leonard generator, the excitation of which is caused to fall to a very small value during the stopping of the crank is very much reduced, so that the back E. M. F. of the working motor exceeds the E. M. F. of the Ward-Leonard generator by a considerable amount. The direction of current in the motor and the Ward-Leonard generator circuit is consequently reversed, so that the motor is braked. This current at the same time flows through the winding $c_2$, but now in such direction that the field of the winding $c_2$ opposes the field of the winding c. The excitation of the Ward-Leonard generator is thus reduced by the winding $c_2$ so that the E. M. F. of the Ward-Leonard generator is still further reduced beyond what would be the case if the winding were absent, simply by reducing the speed of the crank and of the generator C. Consequently, the surplus back E. M. F. of the motor A over that of the Ward-Leonard generator D is greater than without the winding $c_2$, so that the braking effect of the working motor is greater.

Also, in the case of stoppage of the crank, the winding $c_2$ acts only a short time after the speed of the crank has been changed, and ceases to act as soon as the working motor has assumed the new proper speed. After the new speed has been attained, the E. M. F. of the Ward-Leonard generator again exceeds that of the working motor to such an extent that the motor takes up just the output sufficient for compensating for the frictional losses.

Reversal of the drive from full speed in one direction to full speed in the opposite direction is similar to a stopping of the drive followed by re-starting on opposite direction. The action of the winding $c_2$ is in this case exactly the same as explained above, only at the moment when the crank has reversed its direction of rotation, by means of a member arranged on the shaft of the crank, the reversing switch $c_3$ is changed over whereby the field of the winding $c_2$ is reversed.

In the change-over the crank reverses its direction of rotation sooner than the working motor. Thus, during a short period the motor will continue to run in the old direction of rotation, whereas the crank already rotates in the opposite direction. During this period, the E. M. F. of the Ward-Leonard generator and the back E. M. F. of the working motor are equalised and act together to effect a braking of the working motor. The field of the winding $c_2$ is reversed at the moment when the crank changes its direction of rotation, and then is effective in strengthening the field of the generator C and, therefore, strengthens the E. M. F. of the Ward-Leonard generator and increases the braking of the working motor A. After the working motor has also reversed its direction of rotation, the winding $c_2$ continues to cause an increase in the E. M. F. of the generator, so that the motor is quickly started in the opposite direction.

The back E. M. F. of the working motor is reversed when the direction of its rotation is changed, so that now the difference between the electromotive forces of the Ward-Leonard generator and the working motor again becomes effective, and when the new correct speed is attained again becomes so small that it just suffices to ensure a consumption of energy by the motor A which is sufficient to compensate for frictional and other losses.

I claim:

1. In mechanism for training or elevating guns, a Ward-Leonard drive comprising a generator and a motor which supplies power for the movement of the gun, an exciter for the generator, means for driving the exciter in either direction and at different speeds, a constantly and separately excited field winding in the exciter, an additional field winding in the exciter in series with the armatures of the generator and motor of the Ward-Leonard drive, a circuit for the additional field winding, a reversing switch in the circuit of the additional field winding, and means actuating said switch upon reversal of the exciter driving means.

2. In mechanism for training or elevating guns, a manually operated drive means, a Ward-Leonard drive comprising a generator and a motor which supplies power for the movement of the gun, an exciter for the generator, said exciter being operable in either direction and at different speeds by said manually operated drive means, a constantly and separately excited field winding in the exciter, an additional field winding in the exciter in electrical series with the armatures of the generator and motor of the Ward-Leonard drive, a circuit for the additional field winding, a reversing switch in the circuit of the additional field winding, and means actuating said switch upon reversal of the exciter driving means.

ANTON GIETMANN.